United States Patent Office 3,766,126
Patented Oct. 16, 1973

3,766,126
COLOR CONCENTRATE FOR MASS DYEING OF MATERIALS
John Carl Siegle and Homer Bagenstose Wolfe, Wilmington, Del., assignors to E. I. du Pont de Nemours and Company, Wilmington, Del.
No Drawing. Continuation of application Ser. No. 66,875, Aug. 25, 1970. This application Feb. 14, 1972, Ser. No. 226,271
Int. Cl. C08g 51/14; C08f 45/14
U.S. Cl. 260—37 N
24 Claims

ABSTRACT OF THE DISCLOSURE

A color concentrate is provided which enables shaped articles from polymers such as polyolefins, polyesters, vinyl chloride polymers and vinylidene chloride polymers to be easily colored. The color concentrate consists essentially of a thermoplastic amine polymer, protonated salt thereof, or quaternary salt thereof, and from 10 percent up to the stoichiometric amount of an acid dye attached to the amine groups of the polymer. Preferably, the polymer comprises particles (preferably beads with a diameter of up to ⅛ inch) of a copolymer of about 95 to 50 mole percent ethylene and about 5 to 50 mole percent of an aminoalkyl acrylate compound of the formula:

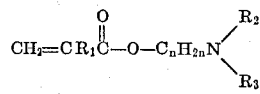

wherein $R_1$ is hydrogen or methyl, $R_2$ and $R_3$ are each a member selected from the group consisting of hydrogen and alkyl of 1 to 4 carbon atoms, and $n$ is a positive integer of 1 to 4 inclusive.

Polymers are colored by melt blending about 0.01 to 15 percent of the color concentrate with another polymer so as to disperse the dye throughout the blend and then forming the blend into a shaped article such as a film, fiber or molded object. The color concentrate is prepared by applying the acid dye to the polymer in a liquid medium, preferably water, at a temperature of 25 to 85° C. and a pH of 2 to 7. Inks of the color concentrate and cellulosic substrates printed with the color concentrate are also provided.

CROSS-REFERENCE TO RELATED APPLICATION

This is a continuation of copending application Ser. No. 6,875, filed Aug. 25, 1970, now abandoned.

BACKGROUND OF THE INVENTION

Field of invention

This invention relates to polymeric color concentrates, their preparation and shaped articles colored thereby, and more particularly to color concentrates of acid dyed amine containing polymers and their use for coloring polymeric materials.

Prior art

Heretofore, solid state masterbatch pigments have been used as one means of introducing color into plastics and other polymeric media. Generally, a masterbatch is composed of a pigment dispersed throughout the plastic at a concentration higher than is desired in the finished product to be colored. The masterbatch can be prepared by mixing the pigment and polymeric material together in a Banbury mixer or extruder, or by using a suitable solvent for the polymer and then dispersing the pigment therein followed by solvent evaporation. One such process for preparing a masterbatch is disclosed in U.S. Pat. 3,361,705, issued Jan. 2, 1968 to James W. Kay and Paul Tabolinsky.

While the above pigment masterbatches have been widely used, they have numerous disadvantages. Among these disadvantages are insolubility of the pigment in the polymer and the fact that colored articles formed therefrom are usually opaque or translucent.

The art has also colored plastic and other polymeric media not possessing their own dye site by placing a dye site in the polymer either by grafting the site onto the polymer or blending a dye site with the polymer. Generally, the dye site containing polymer is molded into shaped articles and then dyed. This procedure is illustrated by U.S. Pat. 3,395,198 issued July 30, 1968, to Isoji Taniguchi, Yoshiharu Tatsukami, Yoshio Kobayashi, Tomohide Yasamura and Reizo Yamadera and U.S. Pat. 3,361,843, issued Jan. 2, 1968 to Robert Miller, Frederick C. Loveless and Milton Farber. While effective dyeing of the polymeric shaped article can be achieved, only a small portion (usually under 25 percent) of the dye sites are utilized when the shaped article is dyed since dye penetration into the interior of the shaped article is difficult.

Furthermore, dyeing of plastics by conventional techniques, such as dissolving the dye in a molten polymer (see U.S. 2,571,319), generally results in colored articles having (1) poor thermal and light stability, (2) the dye migrate out of the polymer, (3) the dye leached by solvents and oils, and (4) poor clarity. In these cases, the dyes are not usually acid dyes and they are not chemically bonded to the polymer.

Thus, coloration of polymeric resins from the polymerization step to the final formation of fibers, films or moldings has been dominated by processes using water-insoluble (or nearly so) pigments, whether they be inorganic or organic, natural or synthetic. The so-called "water-soluble" dyes are generally used to color textiles, paper, leather, and the like, and up to the present have not been widely used to color polymeric resins for several reasons. Since they are not soluable in most polymers, the dyes can only be used in the same manner as pigments, by milling and dispersing them in the polymers. The dyes are, in general, difficult to mill and their color values are weak and dull in this form as compared to the shades conferred on textiles and other such substrates when they are chemically attached to the fibers.

SUMMARY OF THE INVENTION

According to the present invention there is provided a color concentrate consisting essentially of a thermoplastic amine polymer, protonated salt thereof, or quaternary salt thereof and from 10 percent by weight up to the stoichiometric amount, preferably 20 to 80 percent, of an acid dye attached to the amine groups of said polymer. Also provided is an ink wherein the color concentrate is dissolved in an organic solvent, and a process for preparing the color concentrate wherein an acid dye is applied to the aforesaid polymer in a liquid medium, preferably water maintained at a temperature within the range of about 25 to 85° C. and a pH within the range of about 2 to 7.

There is also provided a polymeric blend of the color concentrate and a polymeric synthetic material, a shaped article formed therefrom and a process of forming colored polymeric shaped articles which comprises (1) melt blending about 0.01 to 15 percent by weight of the above color concentrate with about 99.99 to 85 percent by weight of a synthetic polymeric material, and (2) forming the blend into a shaped article. Also provided is a printed cellulosic substrate and a process for printing the substrate using the color concentrate ink.

DETAILED DESCRIPTION OF THE INVENTION

The present invention provides an efficient means for coloring polyolefins and other polymeric synthetic materials by first forming an acid dye color concentrate that is compatible with the polymer which is to be colored. The color concentrate can also be formed into an ink, either with or without an added binder, to color or print cellulosic substrates such as paper.

The acid dye color concentrate of the present invention is preferably formed from a copolymer of ethylene and an aminoalkyl acrylate compound. Such copolymers are described in U.S. Pat. 3,395,198 from column 2, line 42 to column 3, line 63, and such disclosure is hereby incorporated by reference. Particularly preferred copolymers are described in commonly assigned copending application Ser. No. 834,196, filed June 2, 1969, in the name of C. F. Hammer, the disclosure of which is hereby incorporated by reference.

Generally, as described in the above-identified patent and patent application, the copolymers contain from about 95 to 50 mole percent ethylene (preferably about 95 to 85 mole percent) and 5 to 50 mole percent of an aminoalkyl compound (preferably about 5 to 15 mole percent) having the formula:

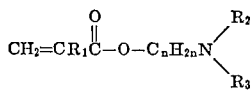

wherein $R_1$ is hydrogen or methyl, $R_2$ and $R_3$ are each a member selected from the group consisting of hydrogen, and alkyl of 1 to 4 carbon atoms, and $n$ is a positive integer of 1 to 4 inclusive.

Melt indices of the copolymers will range from about 0.1 to 5000, preferably 0.1 to 400. Preferred aminoalkyl acrylate compounds are N,N-dimethylaminoethyl acrylate and methacrylate, aminoethylacrylate and methacrylate, N-methylaminoethyl acrylate and methacrylate, N-t-butylaminoethyl acrylate and methacrylate and N,N-dimethylaminobutyl acrylate and methacrylate.

An especially preferred copolymer contains about 7 mole percent (30 weight percent) of dimethylaminoethyl methacrylate and 93 mole percent (70 weight percent) ethylene since it has been found to blend very well and is compatible, i.e., the blend is clear, with polyolefins such as polyethylene and polypropylene.

Copolymers prepared as described in the above-identified patent application will have a melting point defined by the equation:

$$Tm = 125° C. = \alpha \text{ (wt. percent aminoalkyl acrylate)}$$

wherein $\alpha$ is within the range of 1.1 to 1.9 and a thermal stability such that when the temperature is raised at 10° C./minutes under flowing nitrogen, less than 0.75 percent of the copolymer weight has been lost at 300° C.

While the above copolymers are preferred, the color concentrates can be prepared from any thermoplastic amine polymer, protonated salt thereof or quaternary salt thereof. If compatible blends are desired, the particular amine polymer used will depend upon the type of polymeric material to be colored. For example, if polystyrene is to be colored, it may be desirable that the backbone of the amine polymer be styrene, or if an acrylic is to be colored, the backbone of the amine polymer may be an acrylic. Examples of amine polymers useful for preparing color concentrates are the condensation homopolymers or copolymers in which the amine groups are integral parts of the polymer chain such as amine functional polyamides or addition homopolymers and copolymers having pendant groups containing amino groups such as addition copolymers containing aminoalkyl acrylate compounds of the above formula. Exemplary condensation polymers are the condensation products of epihalohydrins or dihaloparaffins with one or more amines, such as disclosed in Belgian Pat. 606,306. Such polymer is the condensation product of dodecylamine, piperazine and epichlorohydrin.

In addition to the above preferred addition polymers, other such polymers are the polyamino-polyamide reaction product of a styrene/maleic anhydride copolymer with 3-(dimethylamino)-propylamine, the styrene/allylamine copolymers disclosed in U.S. 2,456,428.

Quaternary salts of the amine polymers also provide useful color concentrates and can be formed by reacting methyl chloride, dimethyl sulfate, benzyl chloride or other quaternizing agents with the tertiary amine. Similarly, the protonated salts of the amine polymers are easily formed by reacting an inorganic acid, preferably a mineral acid, so that the tertiary amine has a hydrogen atom attached thereto.

The amount of amine present in the polymer should be such that from 10 to 100 percent of the polymer weight can be taken up as acid dye. The exact weight taken up will vary with the dye used, but should normally be between 20 and 80 percent of the polymer weight.

In one manner of preparing the color concentrate, the polymer particles should be as small as possible so that the dye can attach to the basic nitrogen sites on the polymer very quickly. Usually, the polymer particles should have the largest dimension no greater than ⅛ inch, but preferably the bead diameter should range from about 1/64 inch to 1/16 inch or smaller to permit easy dye penetration and pickup. Beads of the latter diameters can be made in the usual manner by extrusion and cutting, by making beads of a larger diameter and then cutting or grinding the large beads into small particles or by forming a solution or dispersion of the polymer such that the subsequent dyeing is performed at the molecular level.

The polymeric color concentrate is generally prepared by placing the copolymer particles in a liquid bath medium containing the acid dye for a period of time sufficient for the dye to attach to the basic dye sites. Heating of the bath will lower the time required for dye penetration, with a temperature of about 60 to 80° C. usually being adequate; however, the bath can be maintained at a temperature within the range of 25 to 85° C. The pH of the bath should be within the range of about 1 to 7, preferably 1.5 to 6, most preferably 4 to 6, depending on the dye used.

A specific process using a preferred polymer involves preparing a bath of water which has been adjusted to a pH of 1.5 to 5 with a mineral acid such as sulfuric, hydrochloric or phosphoric, adding the amine polymer using from about 1 to 10 parts of polymer per 100 parts of water. The pH is again adjusted as desired, depending on the dyeing character of dyes used. Some dyes will require a pH as low as 1.5 to 2 to accomplish sufficient take-up on the polymer, while others will have adequate take-up at pH 4.5 to 5. The highest pH giving adequate dye take-up is prefered so as to avoid undesirable residual acid. Temperature of the bath is adjusted to about 60 to 80° C. and the dye is added gradually and the temperature as well as pH is maintained as dye is added. The polymer is retained in the bath for a time sufficient to provide from 10 to 100 percent dye, based on the weight of polymer; but, total dyeing should not generally extend beyond 3 hours. The dyed polymer is filtered, washed with hot water to remove residual acidity and any unreacted dye, dried and is then ready for further processing, e.g., blending or compounding into an ink. As far as the dye is concerned, the only limitation to be observed in the further processing is that the temperature must be limited to that which can be tolerated by the dye without decomposing. Most of the acid dyes used will tolerate temperatures of at least 200° C., which is generally ample for most processing.

To prepare color concentrates in this manner, any acid dye can be used; although only experience with the individual dyes can ascertain their usefulness at the temperatures and conditions used for shaping and use of the final color concentrate product. Among useful dyes can be listed (by Color Index No.):

C.I. Acid Yellow 29
C.I. Acid Yellow 61
C.I. Acid Yellow 72
C.I. Acid Red 37 (C.I. 17045)
C.I. Acid Red 118
C. I. Acid Red 73 (C.I. 27290)
C.I. Acid Red 159
C.I. Acid Red 151 (C.I. 26900)
C.I. Acid Blue 23 (C.I. 61125)
C.I. Acid Blue 25 (C.I. 62055)
C.I. Acid Blue 82
C.I. Acid Blue 129
C.I. Acid Blue 40 (C.I. 62125)
C.I. Acid Violet 47
C.I. Acid Green 25 (C.I. 61570)
C.I. Acid Green 27 (C.I. 61580)

also

C.I. Acid Yellow 54 (C.I. 19010)
X.I. Acid Yellow 151
C.I. Acid Orange 62
C.I. Acid Red 183 (C.I. 18800)
C.I. Acid Red 195
C.I. Acid Red 158 (C.I. 14880)
C.I. Acid Violet 56 (C.I. 16055)
C.I. Acid Green 12 (C.I. 13425)
C.I. Acid Black (C.I. 15711)
C.I. Acid Yellow 116
C.I. Acid Orange 88
C.I. Acid Red 211
C.I. Acid Red 209
C.I. Acid Blue 168
C.I. Acid Brown 19
C.I. Acid Green 43
C.I. Acid Black 60 and

C.I. Acid Mordant Yellow 1 (C.I. 14025)
C.I. Mordant Red 15 (C.I. 45305)
C.I. Mordant Blue 13 (C.I. 16680)
C.I. Mordant Black 1 (C.I. 15710)
C.I. Mordant Black 3 (C.I. 14640)

Other dyes are Acid Blue 122, C.I. Vat Blue 6 (C.I. 69825), C.I. Pigment Blue 15 (C.I. 74160), Acid Orange 60, Acid Red 182, Disperse Yellow 67, Krolar Orange R, Krolar Yellow Medium, Irdofast Yellow GN,

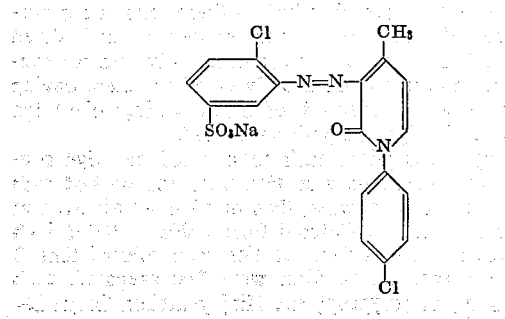

and

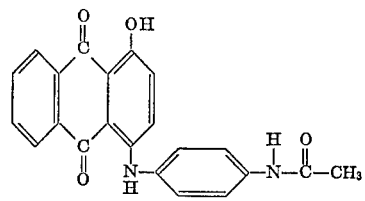

The polymeric color concentrate wherein most of the dye sites have the dye attached thereto have good dye fastness as indicated by standard water and solvent (perchlorethylene) extraction tests. Coloration affected by the use of such a polymeric color concentrate is from the melt state and not by coloration of the final shaped article. Such a procedure has a number of advantages. For example, films are clear, the dye is diffused throughout the article, and the dye cannot be easily extracted with water, solvents or oils.

In coloring polymeric materials, the polymeric color concentrate is melt blended with a synthetic organic polymer to obtain a uniform mixture and the mixture then formed into a shaped article such as a film or fiber. The blend is formed with about 0.01 to 15 percent by weight, preferably 0.5 to 10 percent, of polymeric color concentrate and about 99.99 to 85 percent by weight, preferably 99.5 to 90 percent, of the synthetic organic polymer. While higher concentrations of the color concentrate can be used, there appears to be no reason to use more than 15 percent since the depth of coloration at this level is good. For light colors, low concentrations are used. Of course, the depth and intensity of the color can be varied by using varying amounts of dye concentrate, and will vary depending upon the synthetic organic polymer used.

It is important to provide adequate melt agitation of the color concentrate and the synthetic polymer so as to obtain a shaped article of uniform coloration. The blending can be accomplished in a number of ways. For instance, synthetic polymer particles and polymeric color concentrate particles can be blended in a Banbury mixer and then the blend extruded or otherwise formed into a shaped article, or the particles can be solution blended using a liquid which is a solvent for both the color concentrate and synthetic polymer, the solvent evaporated and then the blend formed into a shaped article. Generally, however, adequate melt mixing occurs in the mixing stage of an extruder. In this latter case, the particles are fed to the extruder and a uniformly colored film, fiber or other shaped article is produced. In making the blends and shaped articles therefrom, other materials can be added to perform their usual functions. For instance, anti-oxidants, ultraviolet light stabiilzers and plasticizers can be used.

It is important for the purpose of this invention to understand the nature of blends of high polymers and the advantages to be obtained from such blends. Blends of high polymers can be divided into three broad categories. The first category comprises blends which are compatible in the purest sense, i.e., on a molecular scale; the second, blends which are not completely compatible on a molecular scale but which have a sufficient degree of molecular compatibility or molecular interaction to provide useful polymeric materials. Polymer blends presently available which typify such behavior are those commercial materials such as the ABS resins, or high impact strength grades of polystyrene. The third category of polymer blends are those for which the compatibility of the two polymeric systems involved is so low that there is no useful behavior. Such systems are found when two blends are made from two strong materials but for which the blends are brittle and tear quite easily. The present invention applies to the first two broad categories. The presence of particular monomers in the copolymer may enable a particular blend system to obtain complete molecular compatibility and thus obtain clear products having high strength and toughness. In other systems, the presence of particular monomers in the copolymer can allow sufficient molecular interaction between the two polymers so that the blends have useful behavior with reasonably high physical strength in spite of the fact that they are hazy or translucent, indicating a degree of heterogeneity.

The synthetic organic polymers used for preparing the polymeric compositions can be any solid organic polymer which is compatible with the polymer of the color concentrate as described above. Illustrative synthetic organic polymers which can be colored by the color concentrate of the present invention are polyamides; cellulose-derived polymers; polyesters such as polyethylene terephthalate and poly 1,4-cyclohexylene dimethylene terephthalate; vinylidene halide polymers such as a copolymer of vinylidene chloride, vinyl chloride (Saran) and polyvinylidene fluoride; vinyl halide polymers in which the vinyl halide is at least 80 percent by weight of the polymer such as polyvinyl chloride, polyvinyl fluoride, copolymers of vinyl chloride with olefins (ethylene and propylene particularly), vinyl acetate, and vinyl ethers; alpha olefin based polymers having 2 to 12 carbon atoms such as polyethylene, polypropylene, chlorosulfonated polyethylene, chlorinated polyethylene, as well as other halogenated polyolefins, ionomers (ethylene/(meth)acrylic acid copolymers neutralized with alkali metal hydroxide), ethylene/vinyl ester copolymers (i.e., vinyl ester of saturated carboxylic acid such as vinyl acetate, vinyl propionate, vinyl butyrate, vinyl stearate) of about 15 to 98 percent vinyl ester and hydrolyzed polymers derived therefrom (ethylene/vinyl alcohol); polymers of styrene such as styrene/methacrylic acid, styrene/acrylonitrile; polymers of acrylonitrile such as polyacrylonitrile, copolymers of at least 40 percent acrylonitrile using other ethylenically unsaturated monomers such as vinyl acetate, vinyl chloride, ethylene and isobtuylene; acrylics such as alkyl esters of ethylenically unsaturated carboxylic acids such as alkyl acrylates and alkyl methacrylates wherein the alkyl group is from 1 to 18 carbon atoms; polyurethanes, polycarbonates; phenolics; polysulfones; epoxy resins; chlorinated polyethers; alkyd resins; acetal resins; ABS resins; silicone resins; and waxes such as petroleum waxes (paraffin wax and microcrystalline wax).

Color concentrate inks useful in coloring or printing cellulosic substrates are prepared by dissolving the color concentrate in an organic solvent with or without an added binder such as polystyrene. Particularly preferred solvents for the preferred polymers are a petroleum derivative solvent such as toluene and a chlorinated hydrocarbon such as perchloroethylene, but it should be understood that the solvent used can depend on the particular color concentrate used. The amount of color concentrate dissolved should be sufficient to provide a dye concentration of about 0.1 to 5 percent by weight.

The ink is applied to a cellulosic substrate such as paper by any conventional technique so that all or a portion of the surface is colored or printed. If desired, the ink can be used to print clear polymer films or woven or non-woven fabrics with appropriate designs, advertisements and product information.

The color concentrates of the present invention have a number of advantages. They will disperse more readily than pigments in the polymer mass and form a clear article, and extrusion equipment can be more easily cleaned. Also, the coloration imparted by the dye fully penetrates the polymeric material whether it be a film, fiber or molded article, and full use is made of the color value inherent in the dye since it is chemically attached to a polymer, hence is molecularly dispersed, and is not present in discrete particles, as is the case with pigments.

The invention can be further understood by referring to the following examples in which parts and percentages are by weight unless otherwise indicated,

EXAMPLE 1

A representative group of acid dyes normally used to dye nylon were used in this example. The dyes were:

No. 1 Acid Red 73, Color Index No. 27290—sulfonic acid azo
No. 2 Acid Blue 25, Color Index No. 62055—sulfonic acid azo
No. 3 Acid Blue 40, olor Nndex No. 62125—sulfonic acid azo
No. 4 Yellow dye—azo

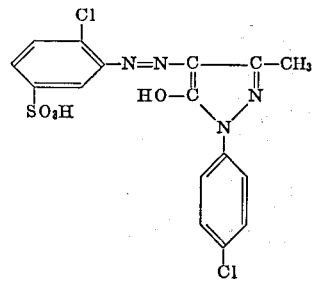

No. 5 Red dye—azo

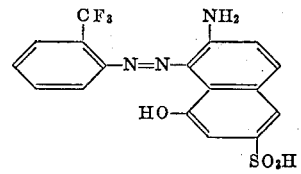

Five baths were prepared, each with 500 ml. of water with pH adjusted to 1.5–2.0 with 0.25 percent sulfuric acid. A 5-gram sample of a copolymer of 70 percent ethylene and 30 percent dimethylaminoethyl methacrylate having a melt index of 300 and a 1/16" to 1/8" diameter irregular-shaped bead was placed in each bath and heated to 75–77° C. with agitation.

Dye was then added gradually, about 1 gram at a time as the color was taken up by the copolymer and was exhausted from the aqueous phase. When no more color was taken up by the copolymer after 15 minutes, it was assumed that maximum absorption had been achieved. The maximum time of heating at 77° C. was 3 hours. The dye absorption for the different dyes is shown in Table I, below.

TABLE I

| Dye No.: | Weight of dye absorbed, percent of copolymer weight |
|---|---|
| 1 | 25.0 |
| 2 | 32.5 |
| 3 | 35.0 |
| 4 | 26.5 |
| 5 | 27.4 |

The percent of dye absorbed in these tests is the percent of pure dye molecule, not the diluted or standardized commercial products. Dyes as commercially sold for dyeing textiles and paper are usually greatly diluted, having often 25 percent or even less of the active ingredient dye molecule in the dye composition as sold.

After dye absorption, each solid copolymer dye concentrate was filtered on a suction filter and washed with about 200 ml. of hot water, then dried in an air oven at 66° C. for 16 hours. Colored films 0.003 to 0.006 inch thick were formed as follows: For each colored film, 2 color-free polypropylene films were first prepared, each using 950 mg. of polypropylene (Enjay-Ribbon Grade D–

452). The coarse granules of polypropylene were placed in a heated hydraulic press between two 8" x 8" polished steel, square plates. Temperature of the plates was adjusted to about 200° C. and pressure was applied slowly, building up to about 140 kg./cm.$^2$ (2000 lbs./sq. in.) in about 1 minute, then held at 140 kg./cm.$^2$ (2000 lbs./sq. in.) for 1 minute and released. After 2 colorless polypropylene films had been prepared in this way, 100 mg. of the copolymer-dye concentrate was placed between the 2 colorless films and a third, colored film pressed under the same conditions described above. This procedure was necessary because the static nature of the equipment (no mixing) caused heat-induced decomposition of the dye concentrate when directly exposed to the hot plates of the press. The film produced by the first pressing was not uniformly colored because of inefficient mixing and the film was therefore cut into small pieces (about 1 inch square) with a scissors and the pressing repeated in the same manner and under the same conditions. This procedure was repeated to a total of 4 pressings, after which the film appeared to be uniformly colored. Additional pressings at the same (~200° C.) temperature for 1 minute at about 560 kg./cm.$^2$ (8000 lbs./sq. in.) pressure gave thinner and correspondingly lighter colored films. Pressings at 260° C. gave films containing bubbles, and in some instances showed definite signs of decomposition of the dye. When 1 of the clear films was placed between 2 pieces of white filter paper and pressed with a weight of 2000 grams at 85° C. for 24 hours, there was no bleed-through of color to the paper. Exposure of each of the films to perchlorethylene liquid at room temperature for 3 days plus 6 hours at 85° C. showed no extraction of color into the solvent.

Similar colored films were obtained when a color concentrate was blended with high- and low-density polyethylene resin, a polyethylene terephthalate resin, polyvinyl-chloride resin and a vinylidene chloride polymer ("Saran").

EXAMPLE 2

Into 9 liters of water was placed 800 g. of the same copolymer used in Example 1, and temperature adjusted to 77° C. The pH was adjusted to 4.5 with concentrated hydrochloric acid, and 100 g. of the crude dye Acid Green 25 (Color Index No. 61570) about 80 percent purity was added slowly. There were indications of a tendency for the copolymer to agglomerate under these conditions. Then 300 g. of the dye was slurried in 500 ml. of hot water and added over 2.5 hours. The temperature was maintained at 77° C., and the pH at 4.5–5.5 by adding hydrochloric acid. After all of the dye had been added, the pH was 5.5 and essentially all of the dye had been removed from the liquid phase. The copolymer dye concentrate was filtered, washed and dried as before, and had 28.6 percent dye in the concentrate.

Laboratory films were made in the same manner as in Example 1, but using 5 pressings at 232° C. for 2 minutes and about 700 kg./cm.$^2$ (10,000 lbs./sq. in.) pressure. Clear green films of uniform coloration resulted.

EXAMPLE 3

In 8 liters of water at 66° C. was placed 400 g. of the same copolymer used in Example 1. Then 200 g. of the No. 4 dye used in Example 1 (purity 78.0 percent) was stirred in 1 liter of water at 66° C. for 1 hour and filtered through cheese-cloth to remove a small amount of undissolved agglomerated material. The dye solution was added to the copolymer slurry over a 1-hour period. The pH was held at 4.0–4.5 by adding hydrochloric acid while temperature was held at 66° C. After the 1-hour addition period the dye was almost completely removed from the liquid phase. The copolymer-dye concentrate was removed by filtration, and washed and dried as before and was found to have 28.1 percent dye in concentrate.

Films were made in the manner as in Example 2. Clear, lemon yellow films of uniform coloration were obtained.

EXAMPLE 4

In 7 liters of water at 66° C. was placed 400 g. of the same copolymer used in Example 1, and in 2 liters of hot water there was dissolved 200 g. of the No. 1 dye used in Example 1 (purity 73.5 percent). After adjusting the pH in the copolymer slurry for 4.5 with hydrochloric acid, the dye solution was added all at once and the mixture held at 66° C. and pH 4–4.5 for 5 hours, at which time the dye was not completely exhausted from the liquid phase. The pH was adjusted to 2.5 and temperature raised to 71° C., then allowed to cool. After about ½ hour with the temperature at 60° C. exhaust was estimated at 90 percent (90 percent of dye taken up by copolymer). The copolymer-dye concentrate was filtered, washed and dried as before and was found to have 24.9 percent dye in the concentrate.

Films prepared as in Example 1 but using 5 pressings at about 200° C. and 1 minute at about 700 kg./cm.$^2$ (10,000 lbs./sq. in.) were clear and had a uniform orange coloration.

EXAMPLE 5

Three color concentrates were prepared using the copolymer and procedure of Example 1, and using the following three dyes: (1) Blue BL (Acid Blue 122), (2) Red L (Acid Red 151 C.I. 26900), and (3) Yellow 4G, the No. 4 dye of Example 1. The three color concentrates contained 25 percent dye, 20 percent dye and 33 percent dye, respectively.

Each of the color concentrates was blended with a polystyrene sugar ("Styron" 666U–26–32) on a two-roll mill having a front roll temperature of 170° C. and a back-roll temperature of 66° C. to give about 4 to 5 percent color concentrate in each blend. When pressed into films, transparent colored films were obtained.

The above color concentrates were also blended with a poly(methyl methacrylate) acrylic resin ("Lucite"), at a concentration of about 4 to 5 percent color concentrate, by blending the concentrate and resin in a one-quart can on a paint shaker for 5 minutes using 1 percent stearic acid (resin basis) as a lubricant. The blends were milled on the two-roll mill having both rolls at 170° C. and then pressed into transparent colored films.

EXAMPLE 6

A color concentrate was prepared as in Example 2 but having about 33 percent dye in the concentrate. It was used to color polypropylene for shaping into fibers.

A 1 percent blend of the color concentrate and 99 percent isotactic polypropylene was prepared by dry blending both components under nitrogen at 200° C., then double passing the dry mix through a ¾" killion extruder equipped with a mixing screw. The extrudate was water quenched and cut into small beads about 3/16" in greatest dimension. A second blend containing 3 percent of the color concentrate was prepared in the same manner.

Fiber was produced by passing the above blends under nitrogen through a conventional spinning unit equipped with a 1" screw and a homogenizing section to provide additional mixing. A 10-hole spinneret with holes 20 x 220 mils was used. Drawing was accomplished in 2 stages with a heated pipe (80–135° C.) between the first and second stage draw rolls. Drawn denier varied between 98 and 300. The fiber was woven into tubes and showed uniform green coloration with very satisfactory utilization of the dye.

Tests on the dyed fibers are summarized in Table II below. In all of these tests the grading system uses the figures 5–4–3–2–1 to describe the changes in properties from the original identity (5) to a slight change (4) to a noticeable change (3) to a considerable change (2) to much changed (1). The perspiration test is AATCC Test 15–1967; the wash test is AATCC Test 61–1968; the dry-clean test is AATCC Test 132–1969; and the lightfastness test is AATCC Test 16E–1964 Xenon Fadeometer.

results were obtained when perchlorethylene was substituted for the toluene.

TABLE II

| Level of dye concentrate, percent | Perspiration test | | | Wash test | | | Dry clean | Lightfastness at— | |
|---|---|---|---|---|---|---|---|---|---|
| | Shade change | Nylon | Wool | Shade change | Nylon | Wool | | 20 hours | 80 hours |
| 1 | 5 | 5 | 5 | 5 | 5-4 | 5 | 5-4, weaker | 4 | 3 |
| 1 | 5 | 5 | 5 | 5 | 5 | 5 | do | 4 | 3-2 |
| 1 | 5 | 5 | 5 | 5 | 4 | 5 | 5-4, yellower and duller | 4 | 2 |
| 3 | 5 | 5-4 | 5-4 | 5 | 4 | 5-4 | 5-4, yellower and weaker | 5 | 5-4 |
| 3 | 5 | 5-4 | 5-4 | 5 | 4 | 5-4 | 5 | | 5-4 |

NOTE.—Perspiration test showed no stain on acetate, cotton, polyester and acrylic fibers.

EXAMPLE 7

Five grams of copolymer of 67.4 percent by weight of ethylene and 32.6 percent by weight of tertiarybutylaminoethyl methacrylate having a melt index of about 150 and particles about ¼" x ¼" x 1/16" in size were slurried in 100 g. of water and 1.25 g. of Color Index Dye 62125, Acid Blue 40, at about 65° C. The pH was adjusted to 5.0 with sulfuric acid, and after a few minutes was lowered to 3.0 by adding additional acid. The dyeing operation was continued under these conditions for a total time of 3 hours, after which the dyed polymer was isolated by filtration and washed with 50 g. of water, then dried in an oven at about 65° C. The dry weight was 5.3 g. Although the particle size used was too large for good efficiency in dyeing, a polypropylene film containing 2.5 percent of the dye concentrate and 97.5 percent polypropylene was prepared as hereinbefore described, using 6 repeated pressings to obtain a clear blue film.

EXAMPLE 8

An amine function 6–66–610 polyamide terpolymer derived from caprolactam, hexamethylene diamine-adipic acid and hexamethylene diamine-sebacic acid containing $330 \times 10^{-6}$ equivalents per gram amine functionality (from diethylene triamine) by analytical titration and having essentially spherical beads about ¼" in diameter was used in this example. Five grams of the polymer were dyed in 200 g. water at about 80° C. using 1.25 g. of the same dye used in Example 6. Dyeing was carried out for 2 hours at pH 3 with excellent dyebath exhaustion. The color concentrate contained 20 percent of dye. Films were prepared as before with 2.5 percent color concentrate and 97.5 percent polypropylene using 7 pressings at 205° C. and 1 pressing at 260° C. A colored, clear film was obtained.

EXAMPLE 9

A copolymer comprising 50 parts octadecenyl methacrylate, 40 parts styrene and 10 parts 2-diethylaminoethyl methacrylate was dissolved in 100 parts kerosene. About 25 ml. of this solution was stirred vigorously in 200 ml. of water slightly acidified with sulfuric acid, and about 1 g. of the same dye used in Example 6 was added. The copolymer mixture was warmed slightly, and after 4 hours the dyed copolymer containing about 15 percent by weight of dye was washed with hot water and finally dried in an oven at 150° C., leaving a hard, rubbery blue sheet. A colored film was prepared using 2.5 percent of the color concentrate and 97.5 percent of polypropylene. Four pressings were made at 205° C., giving a relatively clear, strongly blue film.

EXAMPLE 10

Following the procedure and using the copolymer of Example 1, 3 color concentrates were prepared using the following 3 dyes: (1) Color Index dye Acid Red 151, (2) Color Index dye Acid Blue 40—C.I. 62125, and (3) the No. 4 yellow dye of Example 1. Each color concentrate contained about 22.5 percent dye. Printing inks of each were prepared by dissolving 1.25 g. of color concentrate and 15 g. of polystyrene binder in 50 cc. of toluene. Cardboard panels were colored by dipping a panel in each ink, draining and allowing to dry. Similar The colored panels were compared with similar panels colored with solvent inks prepared from common solvent colors (Color Index Dyes Solvent Yellow 3, Solvent Blue 36 and Solvent Red 24). The panels colored with the inks of the invention showed smoothness, levelness and adherence similar to those colored with the conventional inks.

What is claimed is:

1. A color concentrate consisting essentially of a thermoplastic amine polymer selected from the group consisting of
(1) addition copolymers containing an aminoalkyl acrylate compound having the formula

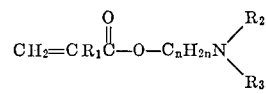

wherein $R_1$ is hydrogen or methyl, $R_2$ and $R_3$ are each a member selected from the group consisting of hydrogen, and alkyl of 1 to 4 carbon atoms, and $n$ is a positive integer of 1 to 4 inclusive,
(2) condensation products of epihalohydrins or dihaloparaffins with 1 or more amines,
(3) the polyamino-polyamide reaction products of a styrene/maleic anhydride copolymer with 3-(dimethylamino) propyl amine,
(4) styrene/allyl amine copolymers,
(5) amine functional polyamides,
(6) protonated salts of the thermoplastic amine polymers of (1) to (5) above, and
(7) puaternary salts of the thermoplastic amine polymers of (1) to (5) above,
and from 10 percent of the polymer weight up to the stoichiometric amount of an acid dye attached to the amine groups of said polymer.

2. The color concentrate of claim 1 wherein the acid dye attached to the amine groups of the polymer is at a concentration within the range of 20 to 80 percent by weight and said polymer has a melt index within the range of about 0.1 to 5000.

3. The color concentrate of claim 2 wherein the amine polymer has a particle size of up to 1/8 inch largest dimension and has a melt index within the range of 0.1 to 200.

4. The color concentrate of claim 2 wherein the amine polymer is a copolymer of about 95 to 50 mole percent ethylene and about 5 to 50 mole percent of an aminoalkyl acrylate compound having the formula:

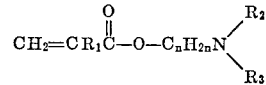

wherein $R_1$ is hydrogen or methyl, $R_2$ and $R_3$ are each a member selected from the group consisting of hydrogen, and alkyl of 1 to 4 carbon atoms, and $n$ is a positive integer of 1 to 4 inclusive.

5. The color concentrate of claim 4 wherein the aminoalkyl acrylate is selected from the group consisting of N,N-dimethylaminoethyl acrylate, N,N-dimethylaminoethyl methacrylate, aminoethyl acrylate, aminoethyl methacrylate, N-methylaminoethyl acrylate, N-methylaminoethyl methacrylate, N-t-butylaminoethyl acrylate, N-t-butylaminoethyl methacrylate, N,N-dimethylaminobutyl acrylate, and N,N-dimethylaminobutyl methacrylate.

6. The color concentrate of claim 5 wherein the copolymer before attachment of the dye has a melting point defined by the equation:

$$Tm - 125°\ C. = \alpha\ (\text{wt. percent amino alkyl acrylate})$$

wherein $\alpha$ is within the range of 1.1 to 1.9, and a thermal stability such that when the temperature is raised at 10° C./minute under flowing nitrogen, less than 0.75 percent of the copolymer weight has been lost at 300° C.

7. The color concentrate of claim 5 wherein the copolymer particle size is within the range of about 1/64 inch to about 1/16 inch.

8. The color concentrate of claim 1 dissolved in an organic solvent so as to form an ink.

9. The color concentrate ink of claim 8 wherein the concentration of the color concentrate in the solvent is such to provide a concentration of dye within the range of about 0.1 to 5 percent by weight.

10. The color concentrate ink of claim 9 wherein the solvent is a petroleum derivative solvent or a chlorinated hydrocarbon solvent.

11. The color concentrate of claim 4 dissolved in an organic solvent so as to form an ink.

12. A process for preparing a color concentrate which comprises applying an acid dye in a liquid medium to a thermoplastic amine polymer selected from the group consisting of (1) addition copolymers containing an aminoalkyl acrylate compound having the formula

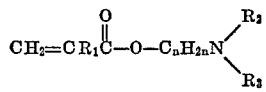

wherein $R_1$ is hydrogen or methyl, $R_2$ and $R_3$ are each a member selected from the group consisting of hydrogen, and alkyl of 1 to 4 carbon atoms, and $n$ is a positive integer of 1 to 4 inclusive, (2) condensation products of epihalohydrins or dihaloparaffins with 1 or more amines,
(3) the polyamino-polyamide reaction products of a styrene/maleic anhydride copolymer with 3-(dimethylamino) propyl amine,
(4) styrene/allyl amine copolymers,
(5) amine functional polyamides,
(6) protonated salts of the thermoplastic amine polymers of (1) to (5) above, and
(7) quaternary salts of the thermoplastic amine polymers of (1) to (5) above, for a time sufficient to provide from 10 percent of the polymer weight up to the stoichiometric amount of dye attached to the amine groups of said polymer.

13. The process of claim 12 wherein the thermoplastic amine polymer has a melt index within the range of about 0.1 to 5000 and the acid dye is at a concentration within the range of 20 to 80 percent by weight.

14. The process of claim 13 wherein the acid dye is added to water containing particles of the polymer up to 1/8 inch largest dimension, said water maintained at a temperature within the range of about 25 to 85° C. and a pH within the range of about 2 to 7.

15. The process of claim 14 wherein the water temperature is within the range of about 60 to 80° C. and the pH is within the range of about 4 to 6.5, and the thermoplastic amine polymer is a copolymer of about 95 to 50 mole percent ethylene and about 5 to 50 mole percent of an aminoalkyl acrylate compound having the formula:

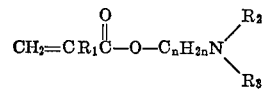

wherein $R_1$ is hydrogen or methyl, $R_2$ and $R_3$ are each a member selected from the group consisting of hydrogen, and alkyl of 1 to 4 carbon atoms inclusive, and $n$ is a positive integer of 1 to 4 inclusive.

16. A process for coloring a polymeric shaped article comprising: (1) melt blending about 0.01 to 15 percent by weight of the color concentrate of claim 1 with about 99.99 to 85 percent by weight of a synthetic polymeric material, and (2) forming the blend into a colored shaped article.

17. The process of claim 16 wherein the synthetic polymeric material is selected from the group consisting of polystyrene, alpha olefin based polymers, polyesters, polyamides, vinylidene halide polymers, vinyl halide polymers, acrylic polymers, acrylonitrile polymers, and mixtures thereof.

18. The process of claim 17 wherein the color concentrate content is from about 0.5 to 10 percent by weight.

19. A process for coloring a polymeric shaped article comprising: (1) melt blending about 0.5 to 10 percent by weight of the color concentrate of claim 4 with about 99.5 to 90 percent by weight of a polyolefin, and (2) forming the blend into a colored shaped article.

20. The process of claim 19 wherein the polyolefin is polyethylene or polypropylene.

21. The process of claim 20 wherein the shaped article is a film.

22. A colored polymeric composition comprising a blend of about 0.01 to 15 percent by weight of the color concentrate of claim 1 and about 99.99 to 85 percent by weight of a compatible polymeric synthetic material in which the acid dye is uniformly dispersed throughout the blend.

23. A colored polymeric composition comprising a blend of about 0.5 to 10 percent by weight of the color concentrate of claim 4 and about 99.5 to 90 percent by weight of a polyolefin in which the acid dye is uniformly dispersed throughout the blend.

24. The colored polymeric composition of claim 23 in the form of a shaped article.

References Cited
UNITED STATES PATENTS

| | | |
|---|---|---|
| 3,190,850 | 6/1965 | Burke, Jr. _____ 260—41 C |
| 3,395,198 | 7/1968 | Taniguchi et al. _____ 260—897 |

MORRIS LIEBMAN, Primary Examiner

S. L. FOX, Assistant Examiner

U.S. Cl. X.R.

260—41 C

PO-1050
(5/69)

UNITED STATES PATENT OFFICE
CERTIFICATE OF CORRECTION

Patent No. 3,766,126     Dated October 16, 1973

Inventor(s) John Carl Siegle and Homer Bagenstose Wolfe

It is certified that error appears in the above-identified patent and that said Letters Patent are hereby corrected as shown below:

Column 12, line 43, Claim 1, "puaternary" should be -- quaternary --. Column 12, lines 74 and 75, underline "t" in "N-t-butylaminoethyl", both occurrences. Column 14, line 11, "$R_2$", second occurrence, should be -- $R_3$ --.

Signed and sealed this 26th day of March 1974.

(SEAL)
Attest:

EDWARD M. FLETCHER, JR.
Attesting Officer

C. MARSHALL DANN
Commissioner of Patents